(12) United States Patent
Dawes et al.

(10) Patent No.: US 11,854,510 B2
(45) Date of Patent: Dec. 26, 2023

(54) SYSTEMS AND METHODS FOR ADVERTISING USING RELATIVE MOTION (71) Applicant: Rovi Guides, Inc., San Jose, CA (US)

(72) Inventors: Charles Dawes, Ryton (GB); Gurjit Bhamra, Cippenham (GB); Donna Harris, Burnham (GB); Pablo Rojas, Wokingham (GB)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/427,107

(22) Filed: May 30, 2019

(65) Prior Publication Data

US 2020/0380934 A1 Dec. 3, 2020

(51) Int. Cl.
*G09G 5/00* (2006.01)
*G06Q 30/0251* (2023.01)

(52) U.S. Cl.
CPC ......... *G09G 5/005* (2013.01); *G06Q 30/0261* (2013.01); *G06Q 30/0266* (2013.01); *G09G 5/006* (2013.01); *G09G 2360/144* (2013.01); *G09G 2360/16* (2013.01)

(58) Field of Classification Search
CPC .......... G06Q 30/0265; G06Q 30/0266; G06Q 30/0261; G06Q 30/0255; G09G 5/005; G09G 5/006; G09G 2360/144; G09G 2360/16; G06F 3/147
USPC ...................................... 705/14.4; 340/425.5
See application file for complete search history.

(56) References Cited

U.S. PATENT DOCUMENTS

| | | | |
|---|---|---|---|
| 6,545,596 B1 * | 4/2003 | Moon | G08G 1/20 340/425.5 |
| 7,921,036 B1 * | 4/2011 | Sharma | G06Q 30/02 705/14.66 |
| 8,788,328 B1 * | 7/2014 | George | G06Q 30/0255 705/14.1 |
| 10,592,916 B1 * | 3/2020 | DeLorean | G08G 1/052 |
| 2006/0271428 A1 * | 11/2006 | Barlow | G06Q 30/02 705/14.64 |
| 2009/0299857 A1 * | 12/2009 | Brubaker | G06Q 30/0247 705/14.66 |
| 2014/0070963 A1 * | 3/2014 | DeLorean | G08G 1/091 340/917 |
| 2016/0148507 A1 * | 5/2016 | Pittman | G06Q 30/0255 340/917 |
| 2017/0371608 A1 * | 12/2017 | Wasserman | G07C 5/008 |
| 2019/0385194 A1 * | 12/2019 | Binkley | G06Q 30/0265 |

OTHER PUBLICATIONS

Dave Yost, Guidelines for Motor Vehicle Advertising, 2015 (Year: 2015).*

* cited by examiner

*Primary Examiner* — Tarek Elchanti
(74) *Attorney, Agent, or Firm* — HALEY GUILIANO LLP (57) ABSTRACT

Systems and methods are described herein for determining an advertisement based on the relative motion of an audience to the advertisement. The system determines the relative motion of the audience to the advertisement and the audience demographics to determine advertisement content and format. The system causes to be displayed the advertisement having both the determined content and format. For example, the systems and methods present a static advertisement image to an audience with a large relative motion to the advertisement, allowing the advertiser to present information to moving audiences who will not be potentially distracted by a video advertisement.

20 Claims, 5 Drawing Sheets

402
Determine information about an audience based on location and identification data about the audience

404
Determine advertisement content and an advertisement format

406
Cause to be displayed the advertisement using the advertisement format

DETERMINE INFORMATION ABOUT AN AUDIENCE

502
Image processing of a person

504
Image processing of a vehicle

506
Communication with a device of the audience

508
Accessing social media profiles of the audience

SYSTEMS AND METHODS FOR ADVERTISING USING RELATIVE MOTION

BACKGROUND

The present disclosure is directed to advertisement personalization systems, and more particularly, to advertisement personalization systems that determine advertisements in response to information about the audience.

SUMMARY

Systems and methods are described herein for a computer-implemented method for displaying an advertisement to an audience in relative motion to the advertisement. In some embodiments, an advertisement personalization system determines information about the audience, the information including data about the relative motion and demographics of the audience. Using the information about the audience, in some embodiments, the advertisement personalization system determines advertisement content and an advertisement format. In some embodiments, once the content and format of the advertisement are determined, the advertisement personalization system causes the advertisement having the advertisement content and the advertisement format to be displayed.

In some embodiments, information about the audience is determined by identifying the audience using image processing of at least one selected from the group of a person or a vehicle. In some embodiments, information about the audience is determined by receiving data over a wireless communications path from a device associated with the audience. In some embodiments, the relative motion includes a relative speed component, and the advertisement content and the advertisement format are determined based on the relative speed component. In some embodiments, the advertisement content and the advertisement format are further based on a geographical location of the advertisement. In some embodiments, the advertisement content is determined by identifying a merchant having a physical location in the vicinity of the geographical location, where the advertisement content includes information about the merchant and the physical location. In some embodiments, the advertisement content and the advertisement format are further based on environmental conditions. In some embodiments, the information about the audience further includes a schedule of the audience and an event within the schedule, and the advertisement content is determined by identifying at least one selected from the group of a product or a service associated with the event. In some embodiments, the advertisement content and format are determined based further on travel records, where travel records include a frequency at which the audience has been at a current location of the advertisement. In some embodiments, the advertisement is caused to be displayed by arranging, based on position data of the audience, the advertisement on a portion of a display screen.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which.

DETAILED DESCRIPTION OF THE DRAWINGS

Systems and methods are described herein for determining an advertisement based on a relative speed between the advertisement and an audience.

Digital advertising is becoming more common as digital media is increasingly mobile and as advertisers learn more about consumers through increasing digital footprints. Advertisements can be displayed in a variety of locations and can be tailored to their audience. Digital advertisements can be displayed on moving objects such as trucks, buses, and trains. The advertisement, however, may not be relevant to or easily seen by its viewers. With an understanding of the audience, the environment, and the relative movement of the audience to the advertisement, an advertisement personalization system may deliver an advertisement that is relevant and properly displayed such that the advertisers communicate clearly and effectively with their target audience.

Figure 1A:
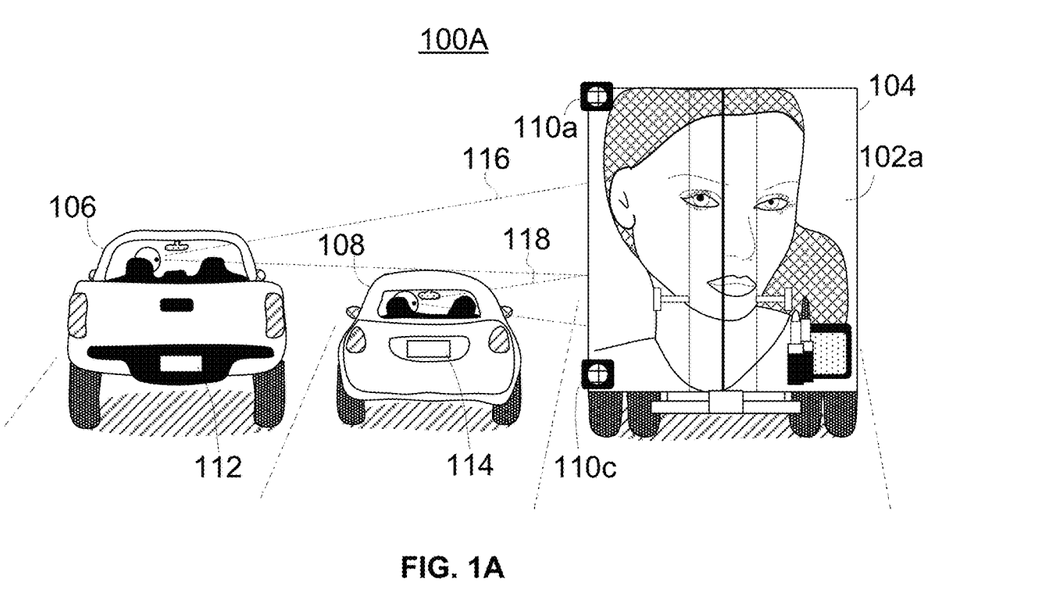
FIGS. 1A and 1B show an illustrative embodiment of mobile advertisements, in accordance with some embodiments of the disclosure.
Figure 1B:
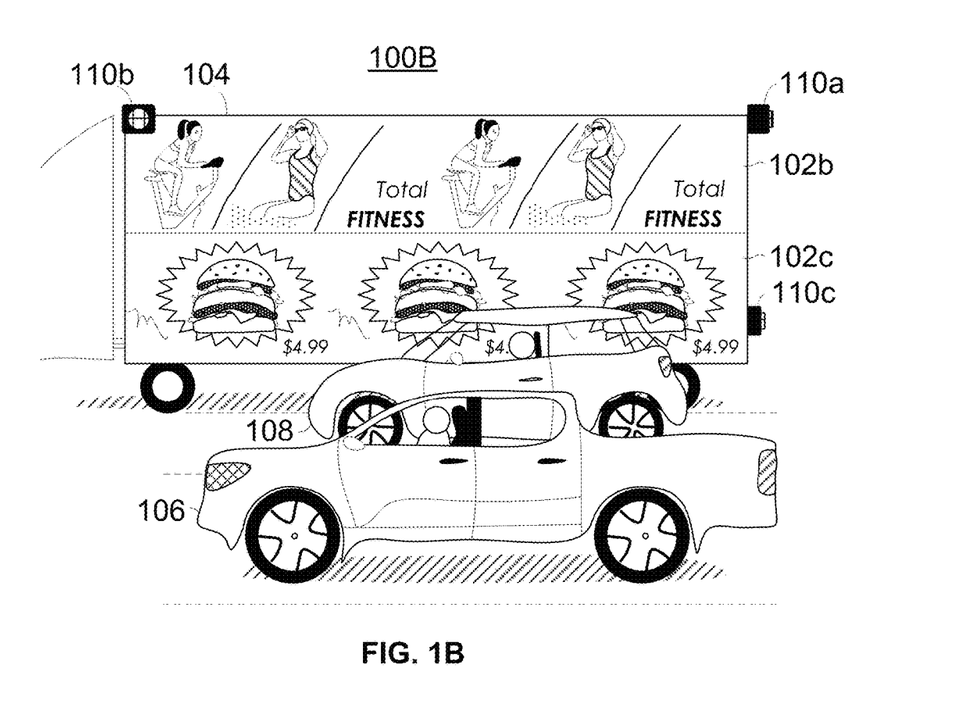

FIGS. 1A and 1B show an illustrative embodiment of mobile advertisements 102a-c, in accordance with some embodiments of the disclosure. View 100A of the illustrative embodiment is presented in FIG. 1A. Side view 100B of the illustrative embodiment is presented in FIG. 1B. Advertisement 102a is on the rear of cargo container 104 while advertisements 102b and 102c are on the left side of cargo container 104. Large vehicle 106 and small vehicle 108 are driving next to the left side of cargo container 104. Cargo container 104 is affixed to a truck capable of moving the advertisement alongside traveling vehicles 106 and 108. Cargo container 104 may be equipped with various sensor devices 110a-c to identify information about cargo container 104's surrounding. The advertisement determination as shown in the illustrative embodiment in views 100A and 100B may be determined by hardware such as control circuitry, as described in the description of FIG. 3.

FIG. 1A shows view 100A of an illustrative embodiment of an advertisement personalization system causing advertisements (e.g., advertisement 102a) to be displayed on the sides of cargo container 104. Cargo container 104 may be stationary (e.g., attached to a truck that is parked on the side of a road) or mobile (e.g., attached to a truck that is moving along a road). The cargo container 104 or corresponding truck may be equipped with various sensors to determine information about an audience within its range. Sensors may include video cameras, radar devices, lidar devices, radio frequency (RF) sensors, any other suitable sensors, or any combination thereof. The advertisement personalization system, including associated sensors, is described further in the description for FIG. 3. In some embodiments, a video camera performs facial recognition or automatic number plate recognition (ANPR) to establish the audience is within a range in which image processing may identify faces and license plates properly. For example, sensor device 110a, sensor device 110c, or a combination of any of the sensor devices communicatively coupled to the advertisement personalization system causing the display of the advertisements on cargo container 104 determines license plates identification 112 and 114 that is on both the front and the back of vehicles 106 and 108, respectively. Sensor devices may detect the amount of light that is incoming towards the advertisements on cargo container 104. For example, sensor 110a includes a photodiode array that communicates to the control circuitry how much current is being generated at the array. Sensor devices may detect the temperature that is surrounding cargo container 104. For example, sensor 110a includes a thermocouple or thermistor that measures the temperature outside cargo container 104. Sensor devices may detect the speed of nearby objects. For example, sensor 110a includes a radar device from which control circuitry may receive measurements to determine the speed of vehicles 106 and 108 relative to sensor 110a. In some embodiments, the sensor devices take into account their own speeds and directions as well as the direction of the other vehicles to determine the absolute speed of the other vehicles relative to a stationary observer. Sensor devices may be embedded with RF circuitry to communicate wirelessly with smart devices nearby. For example, sensor 110a may be Bluetooth-enabled to communicate with other Bluetooth-enabled user devices within range. Similarly, sensor 110a may be equipped with a Wi-Fi hotspot such that user devices within range may join its network and share information from the user device to the advertisement personalization system communicatively coupled with sensor 110a.

Sensor devices associated with the advertisement personalization system causing for display the advertisements on cargo container 104 may include video cameras coupled with control circuitry that is configured to process images taken by the video cameras. The control circuitry may be further configured to identify, in the images, people and where their gazes are directed. In some embodiments, the sensor devices determine the areas of the advertisement display that an audience member can and cannot see. Sensor devices, equipped with video cameras, positioned around the truck may allow the system to determine the angles at which an audience member is able to see the cargo container by determining which cameras have the audience member within their line of sight. For example, the sensor devices may determine that the view of the audience within vehicle 106 is partly obscured by vehicle 108. Further in this example, sensor devices that are positioned at the bottom half of the left side of cargo container 104 do not identify an audience in vehicle 106 within images taken at a time at the respective sensor devices, while sensor devices that are positioned at the top half are able to identify the audience in vehicle 106 within its images taken at the same time. The processing circuitry associated with the sensor devices can determine, based on the presence of the audience in vehicle 106 from certain sensor device images and the lack of presence of the audience in vehicle 106 in other sensor device images, that the bottom half of the display on the left side of cargo container 104 is obscured to vehicle 106.

In some embodiments, the sensor devices may determine that the audience within vehicle 108, because of its small size, is unable to see the upper half of the side of the container. Further in this embodiment, sensor devices positioned at the top half of cargo container 104 do not identify an audience inside vehicle 108 within images taken at a time at the respective sensor devices, while sensor devices that are positioned at the bottom half are able to identify the audience inside vehicle 108 within its images taken at the same time. The processing circuitry associated with the sensor devices can determine, based on the presence of vehicle 108's audience in certain sensor device images and the lack of presence of vehicle 108's audience in other sensor device images, that the top half of the display on the left side of cargo container 104 is observed by vehicle 108's audience. In these embodiments, where the sensor devices can determine the presence of an audience in some images and not others, when the images taken at the same time, the advertisement personalization system determines at which angles the audience can see the display screen.

Information gathered from any combination of license plate recognition, facial recognition, relative motion, temperature, light exposure, and communication with user devices may allow the advertisement personalization system to determine the content and format of the advertisement that is caused to be displayed. In some embodiments, information from license plate recognition includes the license plate number, country or state of registration, driver information (e.g., from publicly available DMV records), any suitable information encoded on license plates, or any combination thereof. In some embodiments, information from facial recognition includes demographic information (e.g., age group, place of residence, income level, or place of employment), identity, any suitable information associated with facial features, or any combination thereof. In some embodiments, information from communication with user devices within a proximity of the advertisement includes identities of users associated with respective user devices, the number of user devices, the types of user devices, the mobile carriers of the respective devices, any suitable information communicable through commercial wireless bands (e.g., Wi-Fi, 4G LTE, or Bluetooth), or any combination thereof.

In some embodiments, information obtained from the sensor devices determines advertisement content. Advertisement content includes a product, service, or activity being advertised, contact information of the merchant (e.g., a phone number, email address, social media handle, or address), any suitable information relevant to the exchange or sale of goods or services, or any combination thereof. As referred to herein, a "merchant" should be understood to include a retailer, a service provider, a manufacturer, a distributor, any other entity in the stream of commerce, or any combination thereof. For example, a combination of audience demographic (e.g., male) and license plate information (e.g., out-of-state plate) allows the advertisement personalization system to determine that a service of likely interest is a local brewery. Temperature (e.g., 5 degrees Fahrenheit) and license plate information (e.g., vehicle make and model), in another example, allow the advertisement personalization system to determine that the advertisement content is motor oil suitable for the vehicle and temperature. Advertisement content may further include the digital representation of the advertisement being displayed (e.g., the bitmap of the video or image that is displayed), advertisement metadata, any representation of the subject of the advertisement, or any suitable combination thereof.

In some embodiments, information obtained from the sensor devices determines advertisement format. Advertisement format includes the brightness of the display, the partition of the display to include multiple advertisements, the file format of the advertisement displayed (e.g., jpg, png, mp3, mp4, or mov), image or video resolution, volume, any suitable formatting of display, or any combination thereof. It should be noted that advertisement content and format are not necessarily two distinct properties determined by the advertisement system. For example, the system may determine a need to change the video resolution from 16:9 aspect ratio to a 4:3 aspect ratio, in which case both the formatting and the content of the advertisement displayed (e.g., the bitmap of the electronic advertisement) are altered. In a nonlimiting example, measurements from a photodiode array within the sensor devices allows the advertisement personalization system to determine that the brightness of the display screen should be increased to accommodate for the incoming sunlight that is causing the audience to experience a glare when looking at the advertisement. An exemplary embodiment is described in FIGS. 2A and 2B.

The advertisement personalization system may determine that the advertisement formatting includes a still image. For example, radar devices embedded within sensor devices 110a-c determine that vehicles 106 and 108 are moving at a relative motion to cargo container 104 that is within a range of speeds that warrants a still image advertisement. In some embodiments, radar devices embedded within sensor devices 110a-c determine that vehicles 106 and 108 are moving at a relative motion to cargo container 104 that is below or above a speed threshold that warrants a still image advertisement. Audiences in vehicles moving much faster than advertisements in their sight may be able to see only a small amount of video frames if the advertisement format was a video. To facilitate communication of advertisement content to the audience, the advertisement personalization system determines the format most conducive to delivering information based on the relative motion of the audience. In some embodiments, the advertisement personalization system determines that the advertisement formatting includes a video. For example, when vehicle 106, vehicle 108, and cargo container 104 are driving slowly in a heavily congested highway, the advertisement personalization system determines that a video advertisement format is appropriate. This determination may be made by the control circuitry of the advertisement personalization system based on the relative motions being within a range of velocities conducive to video advertisements (e.g., 1 mph relative motion is a speed of a moving audience that a video advertisement could be properly communicated to). In some embodiments, the control circuitry may determine that the relative motions are below or above a speed threshold conducive to video advertisements.

In some embodiments, facial recognition information determined by control circuitry from raw images or video captured at the sensor devices allows the advertisement personalization system to change the formatting of the advertisements. For example, control circuitry of the advertisement personalization system causing the display of advertisements on cargo container 104, based on videos or images taken from sensor devices coupled to the control circuitry, determines that the audience within vehicle 106 does not have a clear line of sight to the bottom half of the screen on the left side of cargo container 104. In turn, the control circuitry causes the advertisement customized for the audience within vehicle 106 to be displayed only on the upper half of the screen so that viewing range 116 of the audience of vehicle 106 properly contains the advertisement for display. In view 100A from behind the vehicles of the same embodiment, the audience in vehicle 108 is unable to easily view the top half of the advertisement displayed on cargo container 104 due to the small size of vehicle 108. In this embodiment, control circuitry of the advertisement personalization system uses the images or videos obtained by the associated sensor devices to determine that the proper area of the screen on the left side of cargo container 104 to display the advertisement is on the bottom half. This exemplary partition for the audience in vehicles 106 and 108 is shown in side view 100B in FIG. 1B.

FIG. 1B shows side view 100B of the embodiment in FIG. 1A. Cargo container 104 includes screens to display determined advertisements (e.g., advertisements 102b and 102c) using appropriate formatting. Vehicles 106 and 108 may be driving alongside cargo container 104. Sensor devices associated with cargo container 104 such as sensor devices 110a-110b capture images, locations, and speeds of vehicles 106 and 108. For example, video cameras capture images, wireless communication with user devices within the vehicles obtain location coordinates of the user devices, and radar devices determine the speeds. Based on this information, control circuitry coupled with the sensor devices may determine position information of the audience within vehicles 106 and 108. For example, the position information allows deduction of situational awareness that vehicles 106 and 108 are on the left side of cargo container 104, the audience of vehicle 106 has the bottom half of the display screen on cargo container 104 obscured to them by vehicle 108, and the audience of vehicle 108 has the upper half of the display screen on cargo container 104 obscured to them. Using position information, control circuitry of the advertisement personalization system determines that the advertisement content (e.g., a gym advertisement) directed to the audience of vehicle 106 should be displayed on the top half of cargo container 104's screen and that the advertisement content (e.g., a restaurant advertisement) directed to the audience of vehicle 108 should be displayed on the bottom half of cargo container 104's screen.

The advertisement personalization system may include a feedback loop to advertisers, communicating information collected to the advertisers. In some embodiments, control circuitry determines if the audience had visited a store advertised or purchased the product advertised. The latter may be determined by analyzing the credit or debit card spending of the audience to confirm a purchase was made within a defined time frame from the advert being viewed. For example, after the audience within vehicle 108 has been identified by the advertisement personalization system as having viewed advertisement 102c, the audience may travel to the restaurant to purchase the advertised product. In some embodiments, the advertisement personalization system, based on the GPS coordinates determined by onboard vehicle sensors, includes a recommended location of the restaurant that is nearby the advertisement. At a subsequent encounter with an advertisement personalization system, the system may determine that the audience saw the corresponding advertisement and purchased the product at the restaurant. The advertisement personalization system may then transmit data records about the audience of vehicle 108's history with the advertiser. A time frame may be further implemented to indicate a high correlation between the advertisement and the audience's action. For example, a time frame of 2 hours is used to indicate that any purchases made after 2 hours was not an action done in response to viewing the advertisement.

Further, in the feedback provided to the advertiser, the advertisement personalization system may include information such as where the advertiser's advertisement was shown, when the advertiser's advertisement was shown, the number of people who viewed the advertisement, any suitable information relevant to advertisers, or any combination thereof. The advertisement personalization system may determine if the advertisement has been seen by using line-of-sight or gaze tracking through sensor devices such as video cameras. In some embodiments, voice processing is used as part of the feedback loop by monitoring if the advertisement is mentioned in conversation around the time the advertisement is shown to the audience. The advertisement personalization system may include a microphone or any suitable audio receiver to monitor for mention of the advertisement in conversation. For example, a personal voice assistant on an audience device may monitor the conversation of the audience to provide feedback to the advertisement personalization system that the product advertised was mentioned.

Figure 2A:
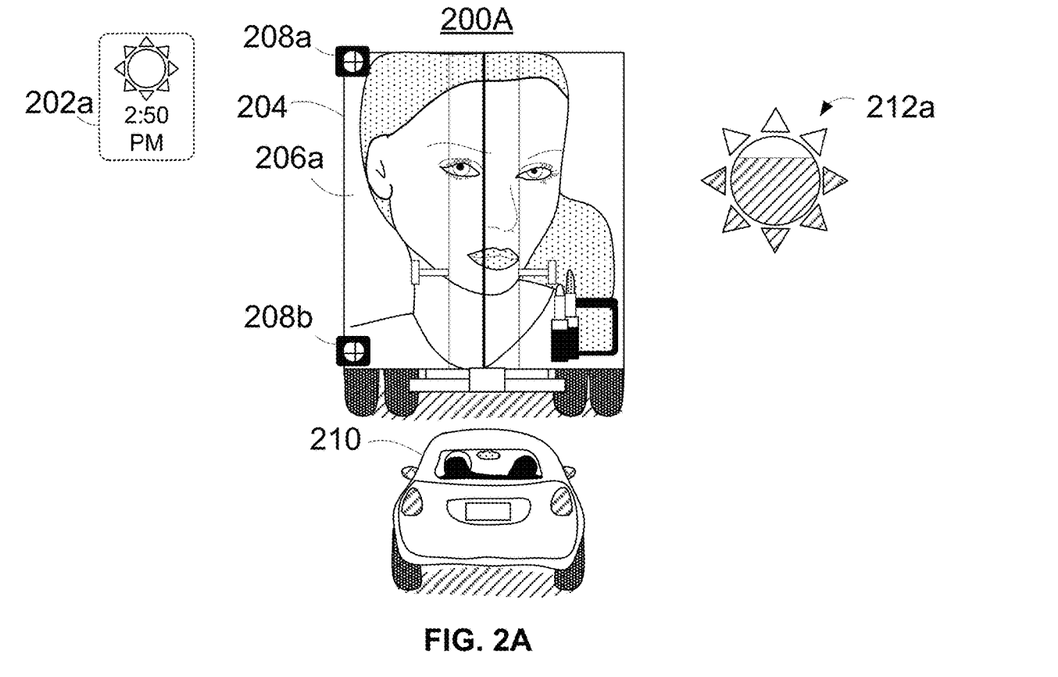
FIGS. 2A and 2B show illustrative embodiments of formatting configuration of mobile advertisements, in accordance with some embodiments of the disclosure.
Figure 2B:
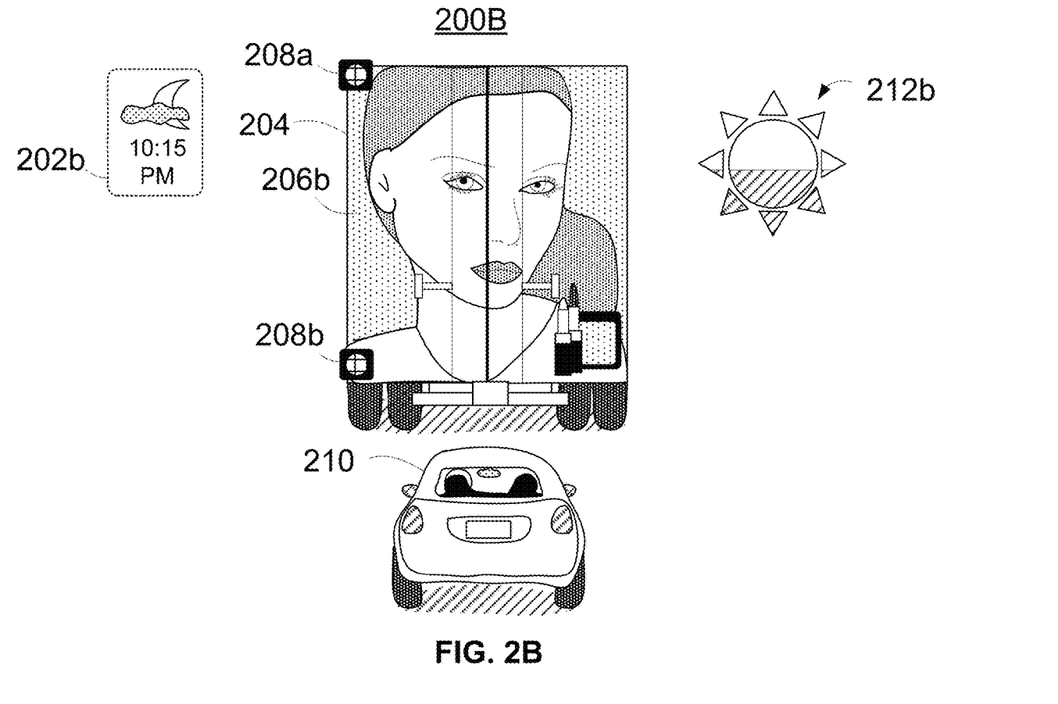

FIGS. 2A and 2B show illustrative embodiments 200A and 200B of the formatting configuration of mobile advertisements 206a and 206b, respectively, in accordance with some embodiments of the disclosure. Embodiments 200A and 200B include a cargo container 204 having a display screen on its rear side. Further depicted is vehicle 210 behind cargo container 204 with the display screen in the viewing range of vehicle 210's audience. The formatting of advertisements 206a and 206b shown on cargo container 204 changes according to environments 202a and 202b. Control circuitry of the advertisement personalization system, as described in detail in FIG. 3, may determine the advertisement format based on the corresponding environment.

FIG. 2A shows illustrative embodiment 200A, in which the advertisement format of advertisement 206a is determined based on information captured from sensors 208a and 208b about environment 202a. In some embodiments, the advertisement formatting includes the brightness level of the display screen on cargo container 204. Brightness indicator 212a reflects a 75% maximum brightness level for the display screen on which advertisement 206a is displayed. Sensor devices 208a and 208b may include video cameras and photodiode arrays, which capture information about the presence of the audience within vehicle 210, their position and viewing angle relative to the rear display screen of cargo container 204, and the amount of sunlight incoming towards the rear display screen. For example, environment 202a, indicative of sunny weather at 2:50 PM, prevents the audience of vehicle 210 from properly seeing advertisement 206a in the absence of proper advertisement formatting (e.g., an incoming ray of sunlight is reflecting off of the rear display screen and is preventing the audience within vehicle 210 from properly seeing the screen). In response to receiving a large amount of current generated by the photodiode arrays of sensors 208a and 208b, the control circuitry of the advertisement personalization system may determine there is a glare caused by the large amount of incoming sunlight. To remove the interference from the glare, the advertisement personalization system may alter the formatting of the advertisement by raising the brightness level of the display screen. The brightness level to which the display screen is adjusted to may be determined based on the measurements taken by sensor devices 208a and 208b. For example, the advertisement personalization system may contain predetermined brightness settings associated with certain ranges of currents generated by photodiodes within sensor devices.

FIG. 2B shows illustrative embodiment 200B, in which the advertisement format of advertisement 206b is determined based on information captured from sensors 208a and 208b about environment 202b. Similar to embodiment 200A, the advertisement formatting of advertisement 206b includes a brightness level as shown in brightness indicator 212b. Brightness indicator 212b reflects a 45% maximum brightness level for the display screen on which advertisement 206b is displayed. The brightness level of brightness indicator 212b is less than that of brightness indicator 212a based on the measurements taken by sensors 208a and 208b of environment 202b. Environment 202b includes cloudy weather at 10:15 PM. In an environment darker than environment 202a, advertisements displayed on cargo container 204 may not need the same brightness level to remove interference from glare caused by incoming sunlight. The audience of vehicle 210 may clearly see advertisement 206b at a lower brightness level.

Figure 3:
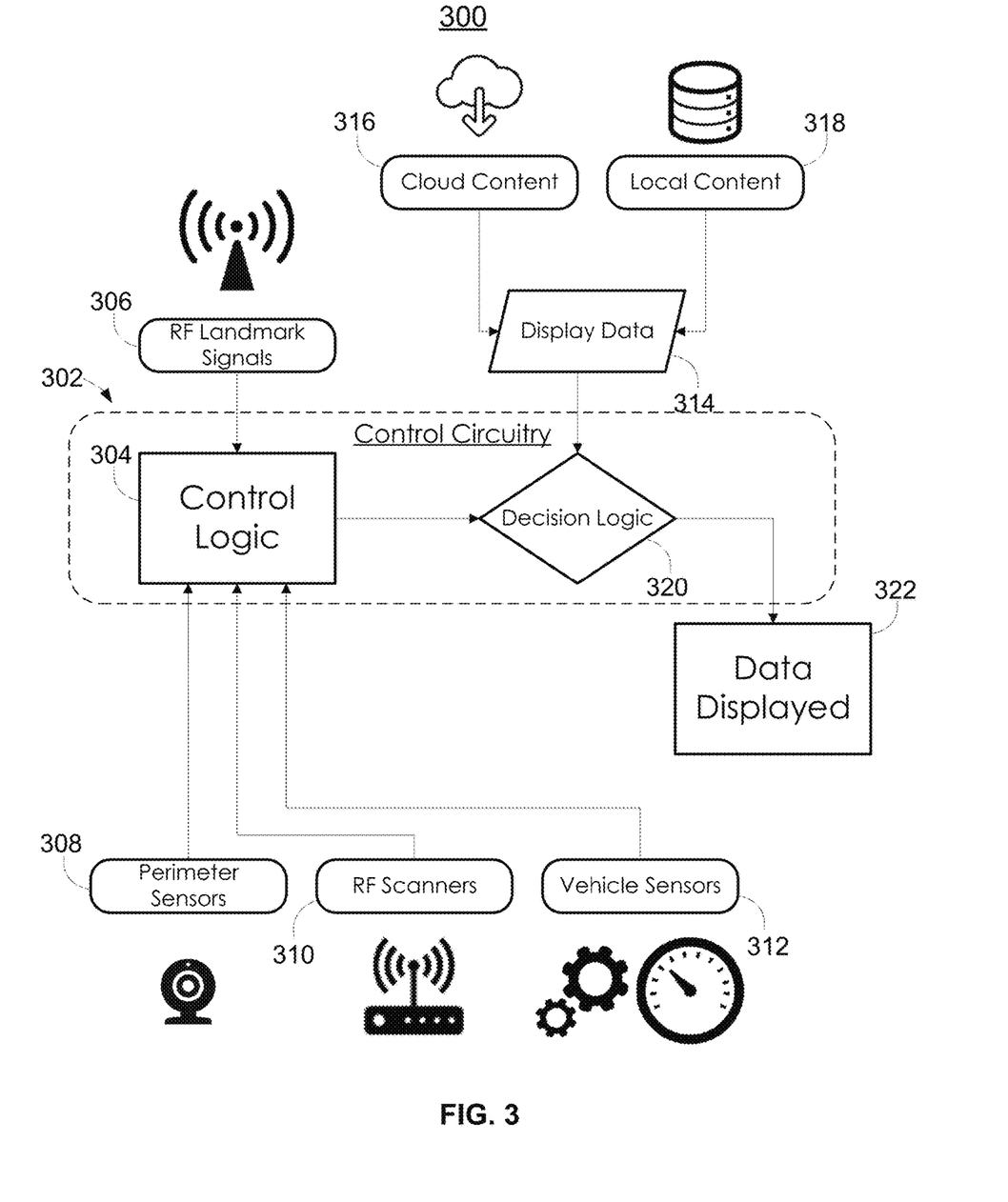
FIG. 3 shows a block diagram of an illustrative advertisement personalization system, in accordance with some embodiments of the disclosure.

FIG. 3 shows a block diagram of illustrative advertisement personalization system 300, in accordance with some embodiments of the disclosure. Advertisement personalization system 300 may be employed on either of vehicles associated with cargo container 104 or 204 and the respective display screens.

Control circuitry 302 of advertisement personalization system 300 includes control logic 304 and decision logic 320. Control logic 304 receives data captured from sensors internal and external to the advertisement personalization system. Sensors that are internal to the advertisement personalization system may include vehicle sensors 312, RF scanners 310, perimeter sensors 308, any other suitable onboard sensors, or any combination thereof. Sensors or devices that are external to the advertisement personalization system may include sensors or devices able to receive and transmit RF landmark signals 306. Control logic 304 may process the data received from these sensors and transmit the processed data to decision logic 320. Based on the processed data, decision logic 320 may decide what display data of display data 314 to use. Display data 314 may represent the data available for targeted data selection by decision logic 320. Display data 314 may be sourced from a remote server (e.g., cloud content 316), a local storage (e.g., local content 318), dynamically generated using loop feeds from perimeter sensors (e.g., augmented reality display), any suitable source of data for advertisement display, or any combination thereof. Decision logic 320 uses the processed data from control logic 304 and the available data from display data 314 to determine data displayed 322 (e.g., the advertisement content and format to be displayed).

Control circuitry 302 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 302 executes instructions for an application stored in memory (e.g., local content 318). Specifically, control circuitry 304 may be instructed by the application to perform the functions discussed above and below. For example, the application may provide instructions to control circuitry 304 to monitor words spoken by a user and determine whether they match words in the content that is being output. In some implementations, any action performed by control circuitry 304 may be based on instructions received from the application.

Control circuitry 302 may be used to send and receive commands, requests, and other suitable data using communications paths depicted as arrows in FIG. 3. Although the communications paths are depicted as one-way arrows, communication is not constrained to the directionality of depicted arrows. For example, control circuitry 302 may both receive and transmit data to RF landmark signals 306. Communications paths may connect control circuitry 302 to one or more communications networks further coupled, though not depicted, to RF landmark signals 306. A communications network may be one or more networks including the Internet, a mobile phone network, mobile voice or data network (e.g., a 4G LTE network), cable network, public switched telephone network, or other types of communications network or combinations of communications networks. Communications paths depicted may include a satellite path, a fiber-optic path, a cable path, a path that supports Internet communications, a free-space connection (e.g., for broadcast or other wireless signals), or any other suitable wired or wireless communications path or combination of such paths. Communications within components of advertisement personalization system 300 may be provided by one or more of these communications paths but are shown as a single path in FIG. 3 to avoid overcomplicating the drawing.

Although communications paths are not drawn between components of advertisement personalization system 300, these components may communicate directly with each other via communications paths, as described above, as well as other short-range point-to-point communications paths, such as USB cables, IEEE 1394 cables, wireless paths (e.g., Bluetooth, infrared, IEEE 402-11x, etc.), or other short-range communications via wired or wireless paths. BLUETOOTH is a certification mark owned by Bluetooth SIG, INC.

Control logic 304, as depicted in FIG. 3, receives data from communicatively coupled sensors and RF devices. In some embodiments, control logic 304 processes the data received before transmitting the processed result to decision logic 320. For example, control logic 304 receives the measured speeds of a nearby audience from perimeter sensor 308 (e.g., radar devices) and the speed of the advertisement display from vehicle sensors 312 (e.g., speedometer). From the audience and advertisement speeds, control logic 304 may determine the relative motion between the audience and the advertisement. Perimeter sensors 308 may include speed sensing devices such as radar, video cameras, temperature sensors such as thermocouples, light sensors such as photodiodes, infrared detectors, any suitable measuring or sensing device for gathering information about the audience and environment, or any combination thereof. Vehicle sensors 312 may include speedometers, voltage sensors, fuel sensors, torque sensors, GPS systems, any sensors of vehicle operations, or any combination thereof. For example, GPS systems may provide data about the travel routes of a vehicle. A vehicle, as referred to herein, includes motor vehicles, railed vehicles, amphibious vehicles, bicycles, aircrafts, spacecrafts, any mobile object capable of being associated with display capabilities, or any combination thereof. Control logic 304 may receive and, though not depicted, transmit information through a large communications network through sensors and RF devices in RF landmark signals 306. RF landmark signals 306 may include RF devices such as cellular towers, Wi-Fi routers, mmWave transceivers, small cell radio access nodes, any suitable RF transceiver, or any combination thereof. In some embodiments, control logic 304 receives data from RF scanners 310, which communicate with nearby audience devices. RF scanners 310 may be a transceiver enabled with near-field communications, RFID, Bluetooth, Wi-Fi, cellular, mmWave, any suitable RF communications protocol, or any combination thereof. For example, a Bluetooth-enabled transceiver within advertisement personalization system 300 may communicate with a smartphone associated with a nearby audience, and data regarding the audience's identification may be exchanged through Bluetooth frequencies.

Though not depicted, control logic 304 may also transmit data gathered locally at advertisement personalization system 300 to external receivers (e.g., receivers associated with a remote server or a second advertisement personalization system). For example, control logic 304 may accrue data about the frequency at which it identifies a specific license plate and transmit the data to a remote server for further processing or storage. Frequency information may allow the control circuitry to determine if the audience is traveling on a routine path or is on a one-off route. In turn, the control circuitry may determine the advertisement content should be a tourist attraction, because the audience is on a one-off route and not a local resident. In some embodiments, control logic 304 transmits the data to a nearby advertisement personalization system through a communications network (e.g., a cellular communications connection, a cable connection, any suitable pathway for data exchange, or any combination thereof). For example, two mobile advertisement personalization systems associated with freight trucks driving next to each other on the highway may exchange information each has collected on its respective routes.

Display data 314 may include data available for targeted advertisement content selection. Display data 314 may come from cloud content 316. In some embodiments, cloud content 316 includes a remote server, external storage connectable to advertisement personalization system 300 through a communications network, any suitable data source that is not stored in a memory local to system 300 (e.g., a memory that cannot be accessed without some external data transmission), or any combination thereof. Display data 314 may come from local content 318. In some embodiments, local content 318 includes memory. Memory may be an electronic storage device, which, although not depicted, may be part of control circuitry 302. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, solid state devices, quantum storage devices, or any other suitable fixed or removable storage devices, or any combination thereof. Local content 318 may be used to store various types of content described herein, including, for example, audience demographic information, audience positioning information, advertisement location over time, environment information, or any suitable combination thereof. Nonvolatile memory may also be used (e.g., to launch a boot-up routine and other instructions). Cloud content 316 (e.g., cloud-based storage) may be used to supplement local content 318 or instead of local content 318. In some embodiments, a database is accessible at the cloud-based storage, where the database stores audience demographic information, audience positioning information, advertisement location over time, and environment information, or any suitable combination thereof.

Display data 314 may include data for static content (e.g., an image), dynamic content (e.g., a video), virtual reality content (e.g., augmented reality), any suitable formatting data for display of advertisements, or any combination thereof. For example, an augmented reality ad implements cameras on the front of cargo containers 104 or 204 to display the video feed on the rear screen of the respective cargo container and augment the video feed with advertising elements. Control circuitry 302 may perform image processing to combine the video feed taken from perimeter sensors 308 with display data 314 to augment reality with an advertisement.

Decision Logic 320 may use the processed data from control logic 304 and display data 314 to determine what data to cause to be displayed and how the data will be displayed. For example, FIG. 2 shows how the brightness setting for the display of data is determined based on environmental factors processed by the control logic.

Data displayed 322 may include data that is caused to be displayed through a screen, a projection, any suitable display instrument, or any combination thereof. Displays may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, the display may be HDTV-capable. In some embodiments, the display may be a 3D display, and the interactive application and any suitable content may be displayed in 3D. A video card or graphics card may generate the output to display. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 302. The video card may be integrated with the control circuitry 302. Speakers may be provided as integrated with the display of data displayed 322. The audio component of videos and other content displayed on the display may be played through the speakers.

Any one or more of the components in advertisement personalization system 300 may be used to determine advertisement content and formatting as shown in embodiments 100A, 100B, 200A, and 200B. Further details of the present disclosure are discussed below in connection with the charts of FIGS. 4-6.

Figure 4:
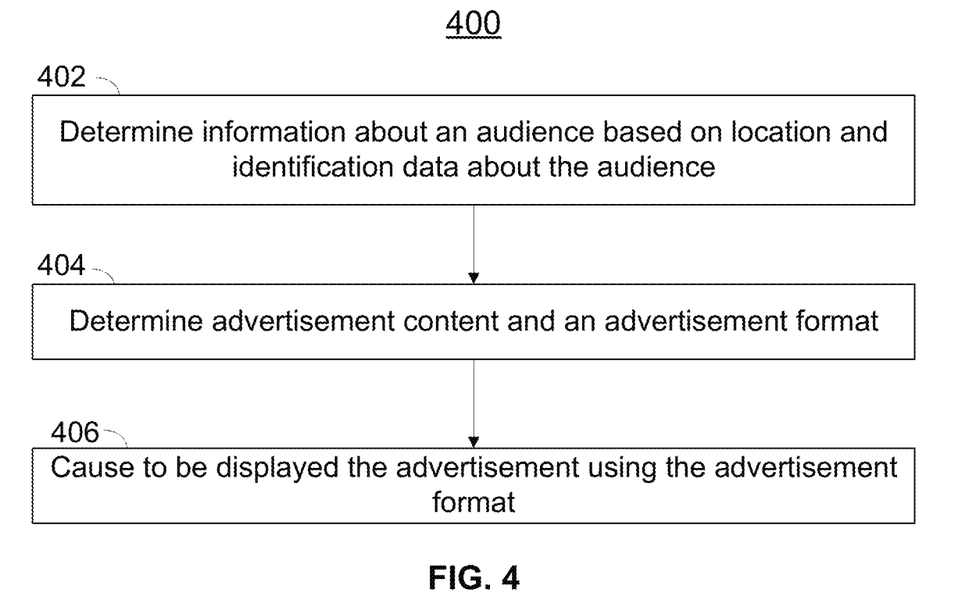
FIG. 4 depicts an illustrative flowchart of a process for causing display of an advertisement, in accordance with some embodiments of the disclosure.

FIG. 4 depicts an illustrative flowchart of process 400 for causing display of an advertisement, in accordance with some embodiments of the disclosure. It should be noted that the steps of process 400 can be performed by control circuitry 302 of FIG. 3 or any of the system components shown in FIG. 3. Control circuitry 302 may be part of a local advertising computing system (e.g., a computing device located on a vehicle that is also coupled to an on-board advertisement display), part of a remote server separated from the user equipment by way of a communication networks (e.g., communication networks connected to RF landmark signals 306 of FIG. 3), or distributed over a combination of both.

At step 402, the advertisement personalization system determines information about an audience based on location and identification data about the audience. In some embodiments, control circuitry (e.g., control circuitry 302) determines information about an audience based on data collected by sensor devices (e.g., perimeter sensors 308, RF scanners 310, and data communicated through RF landmark signals 306). Sensor devices may include video cameras, radar devices, lidar devices, infrared devices, temperature sensors, light sensors, radio frequency (RF) devices, any suitable device capable of measuring information about the audience within proximity of the advertisement, or any combination thereof. Information about the audience may include audience gender, age, occupation, financial choices (e.g., preferred retailers or purchase history), social media, associated contacts, vehicle type, vehicle make, vehicle model, vehicle age, associated user devices, possessions (e.g., clothes the audience is wearing), calendar, user actions (e.g., a sneeze), speed of travel, body temperature, interests, place of residence, data associated with smart devices (e.g., inventory of items in a smart refrigerator), any suitable information about an audience relevant to advertisements, or any combination thereof. In some embodiments, information about the audience includes information about the environment associated with the audience. For example, environment information includes temperature, climate, incoming sunlight, time of day, air quality index, any suitable measurement of the environment or atmosphere, or any combination thereof. Information may be determined directly from sensors or received through a communications network (e.g., RF landmark signals 306). For example, a sensor device associated with an advertisement personalization system on a bicycle may collect information that is communicated to an advertisement personalization system on a car to further determine, by the control circuitry associated with the car, the advertisement content and format in step 404. In some embodiments, the advertisement personalization system determines, from live road traffic information on the Internet (e.g., communicated from RF landmark signals 306) and current location of the advertisement (e.g., determined from a GPS system of vehicle sensors 312), that the relative motion of the audience to the advertisement is small (e.g., both the audience and the advertisement are traveling equally slowly in traffic).

At step 404, the advertisement personalization system determines advertisement content and an advertisement format. In some embodiments, control circuitry determines advertisement content and format based on data collected from sensor devices. Advertisement content includes a product, a service, contact information, prices, any suitable data associated with goods or services for sale, or any combination thereof. Advertisement format includes a multimedia type (e.g., image, video, audio, or any combination thereof), volume, display brightness, color contrast, advertisement location on a screen, video resolution, any suitable formatting associated with presentation of advertisement content, or any combination thereof. The advertisement personalization system, as shown in FIGS. 2A and 2B, may determine the brightness of an advertisement displayed based on the sunlight incoming towards the display screen, as received by photodiode arrays within sensor devices associated with the control circuitry of the advertisement personalization system. In some embodiments, the advertisement personalization system determines that milk should be advertised because of information communicated through RF communications between a sensor device and an audience device indicating that the audience's smart refrigerator is missing its typical stock of milk. In some embodiments, the advertisement personalization system determines that the advertisement content should also include the nearest grocery store that sells the milk that the audience is lacking. In some embodiments, the advertisement personalization system receives, through RF communications between a sensor device and an audience device, the calendar of the audience. Using the calendar of the audience, the advertisement personalization system may determine that the content of the advertisement is for a product related to an upcoming event (e.g., a camping trip) on the audience calendar. In some embodiments, the advertisement personalization system determines, through perimeter sensors such as video cameras, that the audience comprises multiple members. Some members of the audience may obscure the view of the advertisement to other members. The control circuitry may determine which viewing angles are appropriate for which audience members, and in turn, determine that the formatting of the advertisement should include a partition of the display screen in a manner in which all members of the audience are able to see an advertisement in a respective portion of the display screen. The advertisement personalization system may also determine that, based on the audience's velocity and direction, the advertisement formatting includes continuing the advertisement across multiple display screens such that, as the audience travels, the advertisement is within the audience's viewing range. For example, a single advertisement may be split between two sides of cargo container 104 or 204. In another example, a single advertisement may be duplicated on two sides of cargo container 104 or 204.

At step 406, the advertisement personalization system causes to be displayed the advertisement using the advertisement format. In some embodiments, the control circuitry of the advertisement personalization system may transmit the image or video frames to a display screen to be presented to the audience. In some embodiments, the control circuitry projects the advertisement using holographic devices. In some embodiments, the control circuitry uses video cameras to record the surroundings of the advertisement and display the recorded surroundings with an advertisement transposed through image processing on the recording (e.g., augmented reality).

Figure 5:
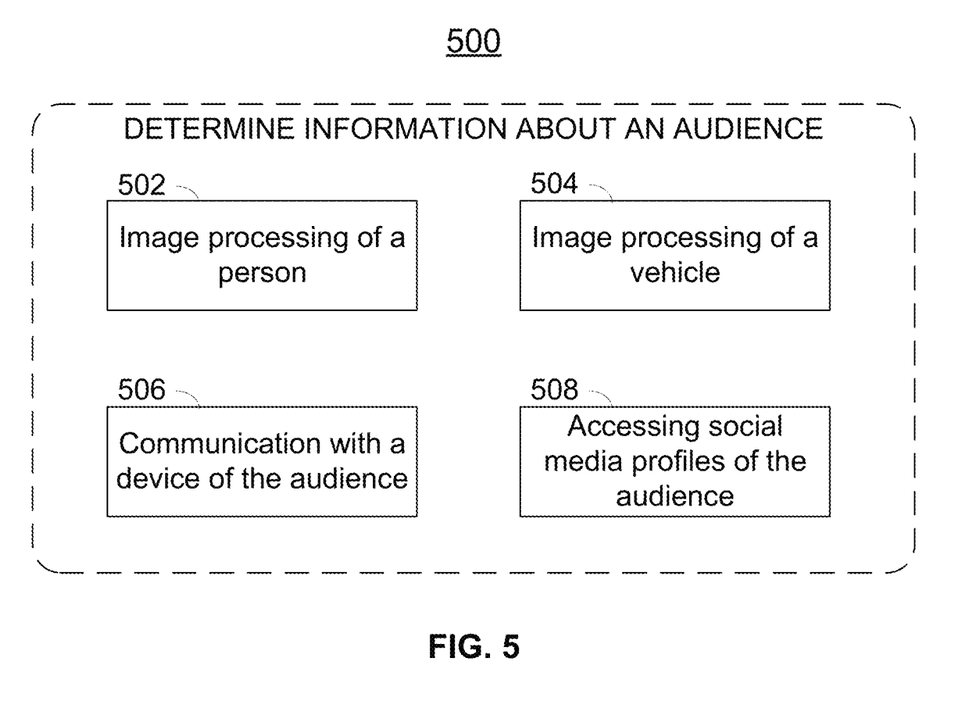
FIG. 5 depicts an illustrative chart of processes for determining information about an audience, in accordance with some embodiments of the disclosure.

FIG. 5 depicts illustrative chart 500 of processes 502-508 for determining information about an audience, in accordance with some embodiments of the disclosure. It should be noted that the steps of processes in chart 500 can be performed by control circuitry 302 of FIG. 3 or any of the system components shown in FIG. 3. Processes 502-508 may be done separately, in varying combinations with each other, in any order, or in parallel with each other.

At process 502, the advertisement personalization system determines information about an audience through image processing of a person. In some embodiments, the advertisement personalization system uses video cameras to capture images of the audience. Details captured in an image may include physical character traits such as height, age, gender, clothing, hair color, skin type (e.g., the skin has acne), jewelry, accessories, shoes, any suitable physical characteristic trait, or any combination thereof. In some embodiments, image processing allows control circuitry to determine that the clothing is a certain style (e.g., a trench coat), and decision logic will decide to advertise a product that is complementary of the style (e.g., a handbag that pairs well with the trench coat). In some embodiments, image processing allows control circuitry to determine that the skin has a certain characteristic (e.g., acne), and decision logic will decide to advertise a product that addresses the characteristic (e.g., an acne treatment cream). In some embodiments, image processing allows control circuitry to determine the viewing angles, as described in the description of FIGS. 1A and 1B, from which audiences can view display screens. In some embodiments, image processing allows control circuitry to determine logos on clothing (e.g., a San Jose Sharks logo), and decision logic will correlate the logo with a nearby store or event related to the logo (e.g., the advertisement is nearby a hockey stadium where the San Jose Sharks will play and advertises a ticket for the upcoming hockey game).

At process 504, the advertisement personalization system determines information about an audience through image processing of a vehicle. In some embodiments, sensor devices (e.g., perimeter sensors 308) of the advertisement personalization system capture images or video of vehicles associated with audiences. For example, images of a vehicle allow control circuitry to determine that, based on license plate images, the vehicle is a limousine or designated chauffeur vehicle. In turn, decision logic 320 of control circuitry 302 may determine the advertisement content and format for the audience within the vehicle—the driver, passenger, or combination of the two. For example, the decision logic displays only an advertisement based on the demographics of the passenger, which can be determined from process 502. In some embodiments, the decision logic determines an advertisement that best corresponds to the interests of both the driver and the passenger, which can be determined from process 502. In some embodiments, image processing determines the velocity of a vehicle. Image processing of the vehicle allows control circuitry to determine details about the vehicle such as make, model, age, location of registration (e.g., a license plate may indicate registration in the state of California), purpose of vehicle (e.g., commercial, private, or diplomatic), any suitable characteristic of a vehicle based on its appearance, or any combination thereof.

At process 506, the advertisement personalization system determines information about an audience through communication with a device of the audience. The advertisement personalization system may include RF transceivers (e.g., RF scanners 310) capable of communicating to devices of the audience through communications protocols such as Wi-Fi, Bluetooth, near-field communications, 4G LTE, any suitable communications protocol, or any combination thereof. In some embodiments, the control circuitry of the advertisement personalization system (e.g., control circuitry 302) communicates with audience devices through the RF transceivers and processes the data received from the audience devices. For example, the advertisement personalization system hosts a local communications network (e.g., a wireless hotspot) that an audience device then joins. Through the established communications path, the advertisement personalization system may receive information about the audience through information transmitted by the respective audience devices. Information transmitted may include an audience calendar, audience preferences, audience purchases, audience location, audience social media profiles, any suitable audience demographic information, or any combination thereof. In some embodiments, the advertisement personalization system uses a live feed of GPS coordinates of the user device to determine the speed of the audience and that the format of the advertisement should be a still image.

At process 508, the advertisement personalization system determines information about an audience through accessing social media profiles of the audience. In some embodiments, the advertisement personalization system accesses social media profiles through communication with audience devices. For example, a smartphone associated with an audience member may transmit information associated with the social media profile of the audience member to the advertisement personalization system. Information associated with the social media profile may include a schedule or calendar of the audience, audience demographic information, audience interests, promotional offers preferred by the audience, any suitable information about the audience that is associated with social media, or any combination thereof. For example, the advertisement personalization system uses the profile photo of an audience member to determine that the user is interested in the Eiffel Tower and determines that the advertisement content should include travel promotions for airlines traveling to Paris. In some embodiments, social media profile information includes scheduling information (e.g., an audience member has an upcoming dinner with a friend) and allows control circuitry to determine that the advertisement content should include a food item, restaurant location, a price of a food item, travel time necessary to arrive at the restaurant location, or any combination thereof. The advertisement content above may be obtained from cloud content 316 (e.g., the live travel time is dynamically determined at a remote server) or local content 318 (e.g., a restaurant has provided its advertisement to the advertisement personalization system to be stored in local memory). Control circuitry may also determine to display whether the audience member will arrive at the location on time given the travel time needed and the scheduled appointment time of the dinner with the friend. In some embodiments, the social media profile of the user could come from multiple sources. For example, an audience chooses to link one or more social media profiles that could influence the advertising. Additionally, the audience may not actively link any profile and the advertisement personalization system could build a profile of the audience based on their interactions with others on social media.

Figure 6:
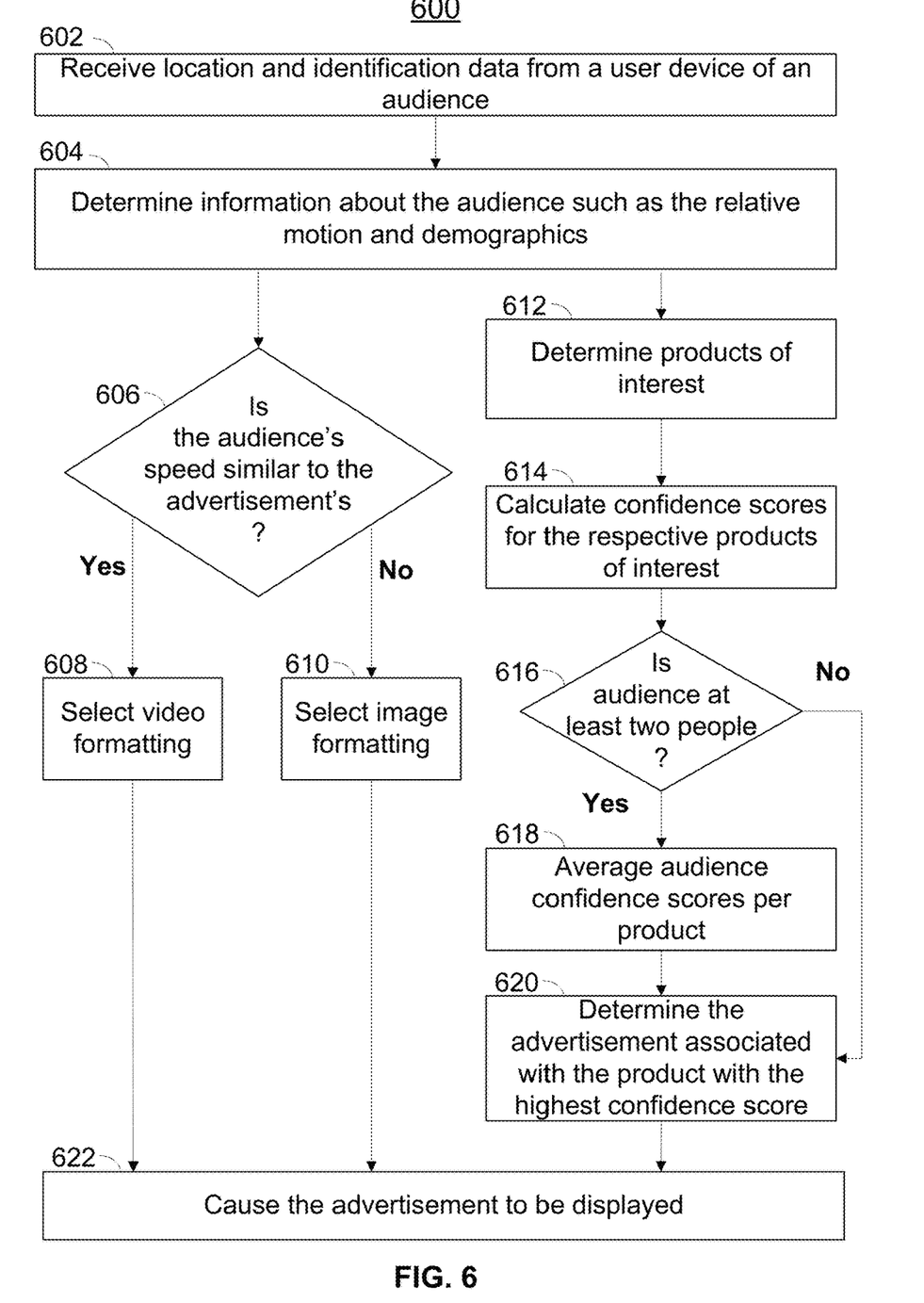
FIG. 6 depicts an illustrative flowchart of a process for causing display of an advertisement based on audience speed, in accordance with some embodiments of the disclosure.

FIG. 6 depicts an illustrative flowchart of process 500 for causing display of an advertisement based on audience speed, in accordance with some embodiments of the disclosure. It should be noted that the steps of process 600 can be performed by control circuitry 302 of FIG. 3 or any of the system components shown in FIG. 3. Control circuitry 302 may be part of a local advertising computing system (e.g., a computing device located on a vehicle that is also coupled to an on-board advertisement display), part of a remote server separated from the user equipment by way of a communication networks (e.g., communication networks connected to RF landmark signals 306 of FIG. 3), or distributed over a combination of both.

At step 602, the advertisement personalization system receives location and identification data from a user device of an audience. In some embodiments, the advertisement personalization system communicates with the user device through a communications network (e.g., a 4G LTE network) to receive the data about the audience. In some embodiments, the presence of the devices is gauged through RF scanners 310. For example, Bluetooth-enabled devices identify themselves to the advertisement personalization system, regardless of whether the respective devices establish a Bluetooth connection, and the control circuitry may determine the number of audience members (e.g., step 616).

At step 604, the advertisement personalization system determines information about the audience such as the relative motion and demographics. In some embodiments, the location data received in step 602 allows control circuitry to determine the relative motion. For example, when the user device communicates the GPS coordinates of the user device over time to the control circuitry, the control circuitry determines the speed and direction of the user device. Using the speed and direction of the user device and the motion of the advertisement (e.g., from vehicle sensors 312 including a speedometer and GPS system), control circuitry may determine the relative motion of the advertisement to the audience associated with the user device. In some embodiments, the identification data received in step 602 allows control circuitry to determine the demographic information about the audience. For example, the user device communicates information from the audience member's social media profile, which includes their birthdate. Using the age of the audience member, the control circuitry may determine that the advertisement content includes a product that is popular among audience members of that age.

At step 606, the advertisement personalization system determines whether the audience's speed is similar to the advertisement's speed. This determination may be using a speed threshold, a range of speeds, any suitable speed comparator, or any combination thereof. In some embodiments, a speed threshold is used to determine whether the advertisement and the audience are traveling at similar speeds. For example, a speed threshold of 3 mph is used to determine advertisement format when an audience is traveling at 5 mph and an advertisement is traveling at 0 mph. The advertisement personalization system may be preconfigured such that when relative motion is greater than the speed threshold, a still image will be used for the format of the advertisement. Consequently, a relative motion of 5 mph exceeds the speed threshold, and the control circuitry determines that the appropriate format of the advertisement content is a still image. Process 600 proceeds, in response, to step 610. In some embodiments, the advertisement personalization system uses a range of speeds to determine the advertisement format. For example, a range of speeds 0-10 mph is used by the control circuitry to determine that the advertisement format should be a video. An audience member traveling at 4 mph and an advertisement at 8 mph may result in a relative motion of 4 mph. Consequently, the relative motion falls within the range of speeds 0-10 mph, and the control circuitry will present a video advertisement to the respective audience member. Process 600 proceeds, in response, to step 608.

At step 612, the advertisement personalization system determines products of interest. In some embodiments, the determination is based on the information about the audience determined in step 604. For example, based on the age of the audience, the control circuitry determines that a product of interest is a ticket to a comedy show at which many attendees are the same age. In some embodiments, the relative motion is used to determine a product of interest. For example, control circuitry may determine that the audience member is traveling at a runner's pace and in turn, determines that the product of interest is athletic footwear for runners.

At step 614, the advertisement personalization system calculates the confidence scores for the respective products of interest. In some embodiments, the products of interest of step 612 are compared and evaluated to produce confidence scores for each product. For example, products of interest including comedy tickets and running footwear may be scored in a manner such that comedy tickets have a higher confidence score than running footwear. Confidence scores may include a number, a percentage, a qualifying indicator, any suitable representation of the level of interest of the audience member to the product, or any combination thereof. For example, comedy tickets may be scored 90% interest level and running footwear may be scored 40% interest level.

At step 616, the advertisement personalization system determines whether the audience is at least two people. In some embodiments, the control circuitry determines the audience count through the number of audience devices within a proximity that have completed a networking handshake with the advertisement personalization system. In some embodiments, the control circuitry determines the audience count through perimeter sensors such as video cameras and image processing to identify the number of people surrounding an advertisement. If the audience is one person, the advertisement personalization system proceeds to step 620. If the audience is at least two people, the advertisement personalization system proceeds to step 618. At step 618, the advertisement personalization system averages the confidence scores for each of the products among audience members. For example, an audience comprising two members, where one audience member has a 40% interest level for running footwear and the other has an 80% interest level, results in an averaged confidence score of 60% for running footwear.

At step 620, the advertisement personalization system determines the advertisement associated with the product with the highest confidence score. In some embodiments, the control circuitry will compare multiple confidence scores and determine the product corresponding to the highest confidence score. For example, the control circuitry determines that tickets for a comedy show having an 80% interest level is the product associated with the highest confidence score when compared to running footwear having a 40% interest level.

At step 622, the advertisement personalization system causes the advertisement determined in step 620 to be displayed with the formatting chosen in either step 608 or 610. In some embodiments, the advertisement may be displayed on a display screen local to the advertisement personalization system (e.g., on a display screen of a cargo container that is connected to its onboard control circuitry). In some embodiments, the advertisement may be displayed on a remote display screen relative to the advertisement personalization system. For example, the advertisement may be displayed on the display screen affixed to a bus whose onboard control circuitry did not make the advertisement determination, but rather received the determination from control circuitry on another vehicle through a satellite connection. In some embodiments, the advertisement may be displayed on a remote display screen belonging to an audience device. For example, control circuitry of an advertisement personalization system determines the advertisement with the highest confidence score, and the advertisement personalization system transmits the data for the advertisement to a nearby audience device to be displayed on the device's screen.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and methods described above may be applied to, or used in accordance with, other systems and methods.

What is claimed is:

1. A computer-implemented method for displaying an advertisement to an audience in relative motion to the advertisement, the method comprising:
   determining, using control circuitry, information about the audience, the information comprising data about the relative motion and demographics of the audience, wherein the relative motion comprises a relative speed component;
   determining, using the control circuitry, based on the information, advertisement content and an advertisement format, wherein determining the advertisement content and the advertisement format comprises:
      determining a location where the advertisement has been displayed, wherein the audience is traveling on a current route passing by the location;
      determining a frequency at which the audience was at the location by determining, from the information, the number of times that the audience has traveled near the location;
      determining that a route type of the current route is a routine travel route if the frequency exceeds a frequency threshold;
      determining that the route type of the current route is a one-off travel route if the frequency does not exceed the frequency threshold;
      determining the advertisement content based on the frequency, wherein the advertisement content comprises one of (i) a first advertisement content item if the frequency exceeds the frequency threshold, wherein the first advertisement content item is associated with the route type being the routine travel route, and (ii) a second advertisement content item if the frequency does not exceed the frequency threshold, wherein the second advertisement content item is associated with the route type being the one-off travel route; and
      determining the advertisement format based on the relative speed component, wherein the advertisement format comprises one of (i) a still image if the relative speed component exceeds a speed threshold and (ii) a video if the relative speed component does not exceed the speed threshold; and
   causing, using the control circuitry, to be displayed the advertisement at a display screen at the location as the audience travels on the current route passing by the location, the advertisement having the advertisement content using the advertisement format, wherein causing to be displayed the advertisement at the display screen comprises:
      identifying, based on position data of the audience, a viewable portion of the display screen and a nonviewable portion of the display screen; and
      arranging the advertisement to be displayed on the viewable portion of the display screen and to not be displayed on the nonviewable portion of the display screen.

2. The method of claim 1, wherein determining information about the audience comprises identifying the audience using image processing of at least one selected from the group of a person or a vehicle.

3. The method of claim 1, wherein determining information about the audience comprises receiving data over a wireless communications path from a device associated with the audience.

4. The method of claim 1, wherein determining, based on the information, the advertisement content and the advertisement format is further based on a geographical location of the advertisement.

5. The method of claim 4, wherein determining, based on the information and on the geographical location of the advertisement, the advertisement content comprises identifying a merchant having a physical location in vicinity to the geographical location, wherein the advertisement content comprises information about the merchant and the physical location.

6. The method of claim 1, wherein determining the advertisement content and the advertisement format further is further based on environmental conditions.

7. The method of claim 1, wherein the information about the audience further comprises a schedule of the audience, wherein the schedule comprises an event, and
wherein determining, based on the information, the advertisement content comprises identifying at least one selected from the group of a product or a service associated with the event.

8. A system for displaying an advertisement to an audience in relative motion to the advertisement, the system comprising:
control circuitry configured to:
determine information about the audience, the information comprising data about the relative motion and demographics of the audience;
determine, based on the information, advertisement content and an advertisement format, wherein the relative motion comprises a relative speed component; and
cause to be displayed on a display screen the advertisement at a display screen at the location as the audience travels on the current route passing by the location, the advertisement having the advertisement content using the advertisement format, wherein the control circuitry is configured to:
identify, based on position data of the audience, a viewable portion of the display screen and a nonviewable portion of the display screen; and
arrange the advertisement to be displayed on the viewable portion of the display screen and to not be displayed on the nonviewable portion of the display screen; and
wherein the control circuitry is further configured to:
determine a location where the advertisement has been displayed, wherein the audience is traveling on a current route passing by the location;
determine a frequency at which the audience was at the location by determining, from the information, the number of times that the audience has traveled near the location;
determine that a route type of the current route is a routine travel route if the frequency exceeds the frequency threshold, wherein the first advertisement content item is associated with the route type being the routine travel route;
determine that the route type of the current route is a one-off travel route if the frequency does not exceed a frequency threshold, wherein the second advertisement content item is associated with the route type being the one-off travel route;
determine the advertisement content based on the frequency, wherein the advertisement content comprises one of (i) a first advertisement content item if the frequency exceeds a frequency threshold and (ii) a second advertisement content item if the frequency does not exceed the frequency threshold; and
determine the advertisement format based on the relative speed component, wherein the advertisement format comprises one of (i) a still image if the relative speed component exceeds a speed threshold and (ii) a video if the relative speed component does not exceed the speed threshold.

9. The system of claim 8, wherein the control circuitry is further configured to identify the audience using image processing of at least one selected from the group of a person or a vehicle.

10. The system of claim 8, wherein the control circuitry is further configured to receive the data over a wireless communications path from a device associated with the audience.

11. The system of claim 8, wherein the control circuitry is further configured to determine the advertisement content and the advertisement format based on a geographical location of the advertisement.

12. The system of claim 11, wherein the control circuitry is further configured to identify a merchant having a physical location in vicinity to the geographical location, wherein the advertisement content comprises information about the merchant and the physical location.

13. The system of claim 8, wherein the control circuitry is further configured to determine the advertisement content and the advertisement format further based on environmental conditions.

14. The system of claim 8, wherein the information about the audience further comprises a schedule of the audience, wherein the schedule comprises an event, and wherein as part of determining the advertisement content, the control circuitry is further configured to identify at least one selected from the group of a product or a service associated with the event.

15. The method of claim 1, wherein:
the advertisement is displayed on a first moving vehicle;
the audience is located in a second moving vehicle; and
the relative speed component comprises a difference between the speed of the first moving vehicle and speed of the second moving vehicle.

16. The system of claim 8, wherein:
the advertisement is displayed on a first moving vehicle;
the audience is located in a second moving vehicle; and
the relative speed component comprises a difference between the speed of the first moving vehicle and speed of the second moving vehicle.

17. The method of claim 4, wherein the information comprises GPS coordinates of the geographical location.

18. The system of claim 11, wherein the information comprises GPS coordinates of the geographical location.

19. The method of claim 1, wherein:
determining that that the route type is the routine travel route if the frequency exceeds the frequency threshold comprises determining the audience comprises a local resident; and
determining that that the route type is the routine travel route if the frequency does not exceed the frequency threshold comprises determining that the audience comprises a tourist.

20. The method of claim 19, wherein determining the advertisement content based on the frequency further comprises:

determining the advertisement content based on a combination of the demographics of the audience and whether the audience comprises the local resident or the tourist.

\* \* \* \* \*